(12) United States Patent
Hwang et al.

(10) Patent No.: US 8,315,460 B2
(45) Date of Patent: Nov. 20, 2012

(54) METHOD FOR RECOGNIZING TEXT FROM IMAGE

(75) Inventors: Seong-Taek Hwang, Pyeongtaek-si (KR); Guee-Sang Lee, Gwangju (KR); Jong-Hyun Park, Gwangju (KR)

(73) Assignees: Samsung Electronics Co., Ltd (KR); Industry Foundation of Chonnam National University (KR)

( * ) Notice: Subject to any disclaimer, the term of this patent is extended or adjusted under 35 U.S.C. 154(b) by 365 days.

(21) Appl. No.: 12/705,292

(22) Filed: Feb. 12, 2010

(65) Prior Publication Data

US 2010/0202690 A1    Aug. 12, 2010

(30) Foreign Application Priority Data

Feb. 12, 2009    (KR) .................. 10-2009-0011543

(51) Int. Cl.
*G06K 9/34* (2006.01)
*G06K 9/00* (2006.01)

(52) U.S. Cl. ...................................................... 382/176
(58) Field of Classification Search .................. 382/164, 382/168–173, 176, 178, 195, 197, 199, 203, 382/224–225, 227, 229, 232; 358/2.1, 3.27, 358/462
See application file for complete search history.

(56) References Cited

U.S. PATENT DOCUMENTS

| | | | | |
|---|---|---|---|---|
| 5,050,222 A * | 9/1991 | Lee | ................................ | 382/176 |
| 6,738,496 B1 * | 5/2004 | Van Hall | ....................... | 382/101 |
| 6,876,765 B2 * | 4/2005 | Suzuki | ........................... | 382/195 |
| 7,324,692 B2 | 1/2008 | Kanamoto et al. | | |
| 7,529,407 B2 * | 5/2009 | Marquering et al. | ........ | 382/176 |
| 7,860,266 B2 * | 12/2010 | Sekiguchi et al. | ........... | 382/100 |
| 8,103,104 B2 * | 1/2012 | Fan | ................ | 382/199 |
| 8,126,269 B2 * | 2/2012 | Eggert et al. | .................. | 382/173 |
| 2003/0007183 A1 * | 1/2003 | Ishiguro | ........................ | 358/2.1 |
| 2003/0012439 A1 * | 1/2003 | Lawton | ......................... | 382/173 |
| 2010/0202690 A1 * | 8/2010 | Hwang et al. | ................ | 382/176 |

FOREIGN PATENT DOCUMENTS

KR    1020050090945    9/2005

OTHER PUBLICATIONS

Ezaki et al., "Text Detection from Natural Scene Images: Towards a System for Visually Impaired Persons", IEEE Computer Society, 2004.

(Continued)

*Primary Examiner* — Amir Alavi
(74) *Attorney, Agent, or Firm* — The Farrell Law Firm, P.C.

(57) ABSTRACT

Disclosed is a method of recognizing a text from an image. The method includes dividing the image into a predefined number of regions through a clustering technique; setting a certain area of the regions as a background region; identifying the outer peripheral pixel and inner peripheral pixel of each region except for the background region of the divided regions; setting a region identified as having one of its outer peripheral pixel and its inner peripheral pixel corresponding to a pixel of the background region, as a boundary region; and setting a region identified as having any of its outer peripheral pixel and its inner peripheral pixel not corresponding to a pixel of the background region, as a center text region, and excluding the boundary region from a binary-coding object of the text.

10 Claims, 5 Drawing Sheets

OTHER PUBLICATIONS

Mancas-Thillou et al., "Natural Scene Text Understanding", Vision System: Segmentation and Pattern Recognition, I-Tech, 2007.

Jung et al., "Text Information Extraction in Images and Video: A Survey", Pattern Recognition Society, 2004.

Gao et al., "Text Detection and Translation from Natural Scenes", CMU-CS-01-139, Jun. 2001.

Chen et al., "Automatic Detection and Recognition of Signs from Natural Scenes", IEEE Transactions on Image Processing, vol. 13, No. 1, Jan. 2004.

Chen et al., "Text Detection and Recognition in Images and Video Frames", Pattern Recognition Society, 2004.

Dlagnekov, "Detecting and Reading Text in Natural Scenes", Introduction Classifiers Boosting Optimizing Binarization Questions, Oct. 19, 2004.

Thillou et al., "An Embedded Application for Degraded Text Recognition", EURASIP Journal on Applied Signal Processing, 2005.

Silapachote et al., "Automatic Sign Detection and Recognition in Natural Scenes", IEEE Workshop on Computer Vision Applications for the Visually Impaired, Jun. 2005.

* cited by examiner

METHOD FOR RECOGNIZING TEXT FROM IMAGE

PRIORITY

This application claims priority under 35 U.S.C. §119(a) to an application entitled "Method for Recognizing Text from Image" filed in the Korean Industrial Property Office on Feb. 12, 2009 and assigned Serial No. 10-2009-0011543, the contents of which are hereby incorporated by reference.

BACKGROUND OF THE INVENTION

1. Field of the Invention

The present invention relates generally to a method for recognizing text, and more particularly to a method for recognizing text contained in an image.

2. Description of the Related Art

As a technology has advanced, text recognition technologies using an image picturing apparatus (for example, a camera and a mobile device having a camera) have been proposed.

Technologies for extracting text (a character or a character region) from an image photographed through an image capturing apparatus, binary-coding the extracted text and recognizing the text have been proposed through several methods, but the prior art technologies have not provided a method of photographing a signboard (for example, a billboard) and recognizing a text from a signboard-photographed image.

In particular, in a signboard where a boundary of a text form is applied in the periphery of the text in order to deliver visual aesthetics and information, when the prior art method attempts to extract and recognize the text from such signboards, the text may not be recognized normally.

SUMMARY OF THE INVENTION

Accordingly, the present invention provides a method for precisely recognizing a boundary applied text from a signboard photographed image.

In accordance with an aspect of the present invention, there is provided a method of recognizing text from an image, including dividing the image into a predefined number of regions through a clustering technique, setting a certain area of the regions as a background region, identifying an outer peripheral pixel and an inner peripheral pixel of each region with the exception of the background region of the divided regions, setting a region identified having one of its outer peripheral pixel and its inner peripheral pixel corresponding to a pixel of the background region, as a boundary region, setting a region identified having any of its outer peripheral pixel and its inner peripheral pixel not corresponding to a pixel of the background region, as a center text region, and excluding the boundary region from a binary-coding object of the text.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE INVENTION

Hereinafter, embodiments of the present invention will be described in detail with reference to the accompanying drawings.

Figure 1:
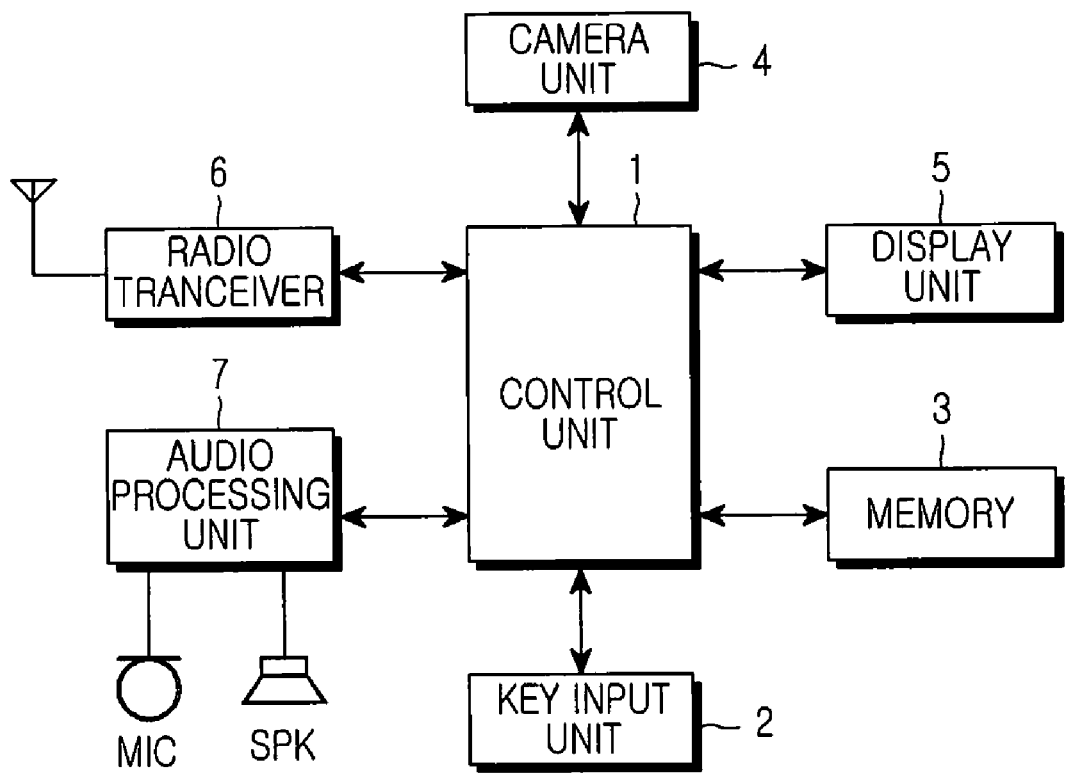
FIG. 1 is a block diagram of an apparatus that recognizes a character from an image according to an embodiment of the present invention.

FIG. 1 is a block diagram of an apparatus that recognizes a character from an image according to an embodiment of the present invention.

Referring to FIG. 1, a radio transceiver 6 includes a Radio Frequency (RF) unit (not shown) and a modem (not shown). The RF unit includes a RF transmitter for up-conversion of the frequency of an outgoing signal and amplification of the signal, a RF receiver for low-noise amplification of an incoming signal and down conversion of its frequency, and the like. The modem includes a transmitter for coding and modulating a signal to be transmitted, a receiver for demodulating and decoding a signal to be received in the RF unit, and the like. Under the control of a control unit 1, the radio transceiver 6 can transmit/receive an image that is an object of character recognition or transmit/receive a character recognized from the image.

An audio processing unit 7 may form a codec, and the codec includes a data codec and an audio codec. The data codec processes packet data or the like, and the audio codec processes an audio signal such as a sound and a multimedia file. Also, the audio processing unit 7 converts a digital audio signal received at the modem into an analog signal for reproduction through the audio codec or converts an analog audio signal generated from a microphone into a digital audio signal through the audio codec and transmitting it to the modem. The codec can be separately provided or it can be included in the control unit 1.

A key input unit 2 has keys used to input numbers and characters and function keys used to operate various functions. The key input unit 2 can be a keypad for displaying visual information, has and have a device capable of displaying visual information, such as Organic Light-Emitting Diode (OLED), Liquid Crystal Display (LED), or the like, on the keypad.

A memory 3 may include a program memory and a data memory. The program memory stores a program for controlling the general operation of a mobile terminal. The memory 3 stores an image photographed by a camera unit 4, or stores a character recognized from the image in a character format or an image format.

A display unit 5 may output many kinds of display information generated at the mobile terminal. Herein, the display unit 5 can include a LED, an OLED or the like. In addition, the display unit 5 can provide a touch screen function so that it can act as an input unit for controlling the mobile terminal together with the key input unit 2. The control unit 1 can control the display an image photographed by the camera unit 4 or control the display a character recognized from the image.

The camera unit 4 includes a camera sensor for capturing image data and transforming a captured optic signal into an electric signal, and a signal processing unit for converting an analog image signal captured by the camera sensor into a digital data. Herein, the camera sensor can be a Close-Coupled Device (CCD) sensor, and the signal processing unit can be realized by a Digital Signal Processor (DSP). The camera sensor and the signal processing unit can be carried out in an integral form, or can be realized separately. The camera unit 4 can take a photograph of a signboard for recognizing a character.

The control unit 1 controls the general operation and the switching of a driving mode of an apparatus for recognizing a character from an image according to an embodiment of the present invention.

Figure 2:
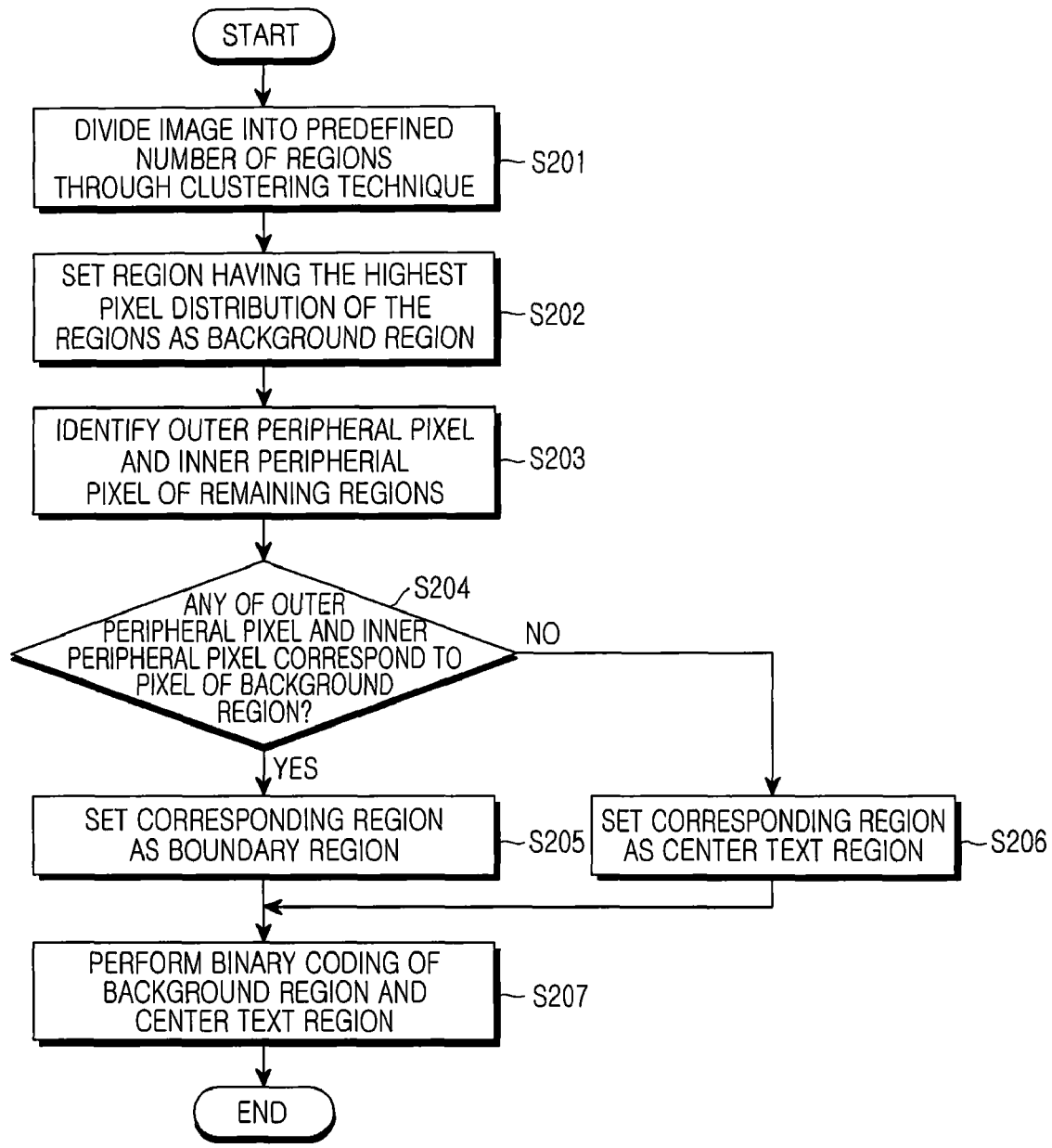
FIG. 2 is a flow diagram of a method of recognizing a character from an image according to an embodiment of the present invention.
Figure 3:
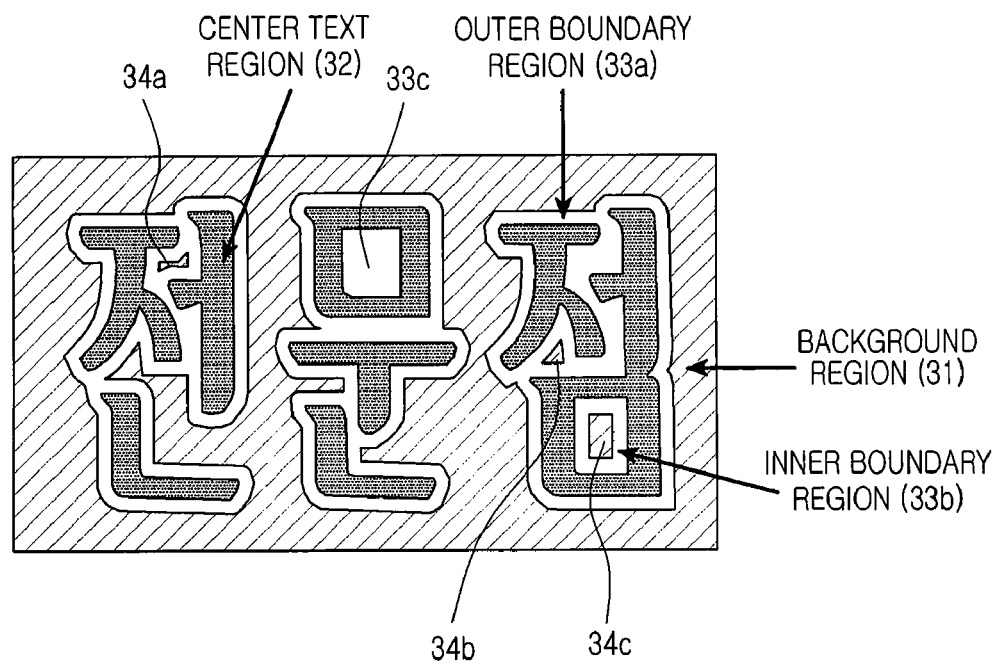
FIG. 3, FIG. 4A and FIG. 4B are diagrams of a method of recognizing a character from an image according to an embodiment of the present invention.
Figure 4A:
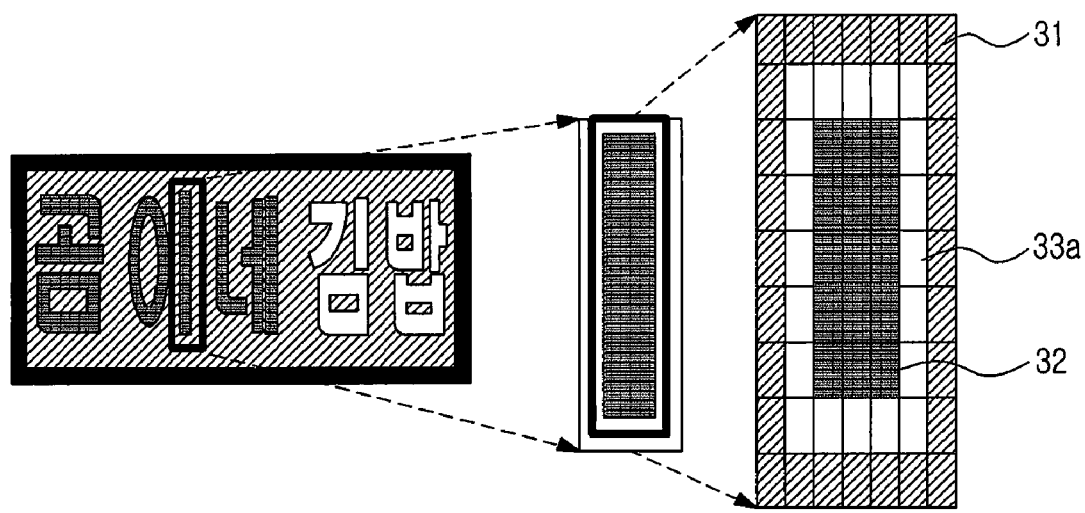
Figure 4B:

FIG. 2 is a flow diagram of a method of recognizing a character from an image according to an embodiment of the present invention, and FIG. 3, FIG. 4A and FIG. 4B are diagrams of a method of recognizing a character from an image according to an embodiment of the present invention. Referring to FIG. 2, the control unit 1 divides an image into a predefined number of regions through a clustering technique in step S201, and controls to set a region of the highest pixel distribution among the divided regions as a background region in step S202.

In FIG. 3, an object intended for character recognition according to an embodiment of the present invention is a signboard photographed image. Of the signboard photographed image, the background region 31, a center text region 32 necessary for delivering advertisement information and also an outer boundary region 33a and an inner boundary region 33b, 33c wrap the center text region 32 that corresponds to a character recognition object according to an embodiment of the present invention. Although Korean characters are depicted in the drawings, any language characters can be processed by the present invention The clustering technique is used for classifying data of a similar feature, that is, the clustering technique divides the entire image into pixel regions having an equal (or similar) characteristic by grouping pixels of the image as several numbers of sets by considering a piece of pixel information including pixel color information, an inter-pixel distance, etc.

Thus, the control unit 1 divides (that is, clusters) pixels configuring an image into a predefined number of regions through the clustering technique. Specifically, in accordance with an embodiment of the present invention, an image is divided into three regions of a background region, an outer and inner boundary region, and a center text region.

Thereafter, the control unit 1 sets the highest region of pixel frequency (or distribution) of the divided three regions as a background region, as an image is a signboard photographed image and a background of the signboard photographed image occupies the largest area of the entire image in signboard's characteristic. At this time, the control unit 1 can set a pixel set configured in the most constant pixel pattern as a background region, because the background of a signboard, upon considering a signboard's characteristics, is uniform and shows the smallest change in form, color, distribution, etc. In FIG. 3, an embodiment of the present invention deals with a background area 34a through 34c isolated by a boundary region (an outer boundary region or an inner boundary region) like the aforementioned background region because it has the same pixel color as the other background region.

The control unit 1 identifies the outer peripheral pixel and inner peripheral pixel of the remaining regions in step S203, and identifies if one of the outer peripheral pixel and inner peripheral pixel corresponds to a pixel of the background region in step S204.

When the setting of the background region is completed, the control unit 1 controls to identify information (for example, RGB information) of the outer peripheral pixel and the inner peripheral pixel for a preset pixel distance for each of the two remaining regions except for the background region.

FIG. 4A shows one example of identifying an outer peripheral pixel and an inner peripheral pixel, and shows an example of identifying a center text region 32 and the outer peripheral pixel of an outer boundary region 33a and the inner peripheral pixel which correspond to a boundary region.

In FIG. 4A, the control unit 1 first identifies peripheral pixels of the outer boundary region 33a, that is, the control unit 1 controls to identify pixels of the background region 31 corresponding to the outer peripheral pixel of the outer boundary region 33a and pixels of the center text region 32 corresponding to the inner peripheral pixel of the outer boundary region 33a. At this time, the control unit 1 may determine a region of pixels the background region 31 as an outer boundary region 33a.

When the identification of peripheral pixels of the outer boundary region 33a is completed, the control unit 1 identifies peripheral pixels of the center text region 32. The control unit 1 controls to identify pixels of the outer boundary region 33a if there is no inner peripheral pixel of the center text region 32. If there is no inner peripheral pixel of the center text region 32, the control unit 1 can identify all of the inner peripheral pixel and the outer peripheral pixel of the center text region 32. For example, because in a center text region equivalent to a vowel 'ㅏ' shown in FIG. 4A, there only exists pixels corresponding to the vowel 'ㅏ' and there is no peripheral pixel inside, the control unit 1 controls to identify its outer peripheral pixel only. In the case of a consonant 'ㅁ' shown in FIG. 4A, the control unit 1 can identify all of the inner peripheral pixel and the outer peripheral pixel.

As an identification result of in step 204, the control unit 1 sets a region in which one of the outer peripheral pixel and the inner peripheral pixel is identified as a pixel corresponding to the background region, as a boundary region of the remaining regions in step S205, and the control unit 1 controls to set a region in which any of the outer peripheral pixel and the inner peripheral pixel not identified as a pixel corresponding to the background region, as a center text region in step S206.

In FIG. 4A, the control unit 1 controls to set the region 33a in which its outer peripheral pixel is identified as a pixel corresponding to the background region and its inner peripheral pixel is identified as a pixel corresponding to the center text region, as a boundary region (that is, outer boundary region). In addition, the control unit 1 controls to set the region 32 in which there is no inner peripheral pixel and its outer peripheral pixel is identified as a pixel corresponding to a boundary region (that is, an outer peripheral region), as a center text region.

Thereafter, the control unit 1 performs binary-coding of the background region and the center text region in step S207.

When a background region, a center text region and a boundary region (an outer boundary region and an inner boundary region) are identified from a signboard photographed image through steps S201-S206, the control unit 1 performs the binary-coding on the center text region and the remaining regions (that is, a boundary region and a background region).

That is, with text binarization performed to recognize a character from an image in general, the control unit 1 can precisely recognize the character by performing the text binarization after the boundary region, which lowers the recognition rate of character recognition, is excluded from the center text region (that is, the boundary region is also set as the background region). FIG. 4B shows the result of text binarization after a boundary region is excluded from the image of a signboard where its center text region is wrapped by the boundary region, through steps S201-S207.

Some errors will occur when an isolation region 33c of the inner boundary region shown in FIG. 3 is determined as a center text region because the outer peripheral pixel is not a background region and no inner peripheral pixel exists. To adjust for the error, the control unit 1 can calculate the size of the stroke of the obtained center text region and its length in the vertical direction and the horizontal direction. The stroke of the center text region may be longer in a vertical direction or in a horizontal direction, or the stroke has length of some order in a horizontal/vertical direction. Therefore, the vertical length and horizontal length of regions determined as a center text region are obtained, and then a region which is less than a given value in all directions is determined as an isolation region of the inner boundary regions and thus excluded from the center text region.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of recognizing text from an image, comprising the steps of:
    dividing the image into a predefined number of regions through a clustering technique;
    setting an area of the regions as a background region;
    identifying an outer peripheral pixel and an inner peripheral pixel of each region except for of the background region of the divided regions;
    setting a region identified as having one of its outer peripheral pixel and its inner peripheral pixel corresponding to a pixel of the background region, as a boundary region;
    setting a region identified as having any of its outer peripheral pixel and its inner peripheral pixel not corresponding to a pixel of the background region, as a center text region; and
    excluding the boundary region from a binary-coding object of the text.

2. The text recognition method of claim 1, wherein the background region is a region of the highest pixel frequency among the divided three regions.

3. The text recognition method of claim 1, wherein the background region is a region of the most constant pixel pattern among the divided three regions.

4. The text recognition method of claim 1, further comprising recognizing a character by excluding pixels which correspond to the boundary region and performing binary-coding of the background region and the center text region.

5. The text recognition method of claim 1, wherein the boundary region is divided into an outer peripheral region wrapping the center text region outside of the center text region and an inner peripheral region wrapping the center text region inside of the center text region.

6. An apparatus of recognizing text from an image, comprising;
    a control unit for:
        dividing the image into a predefined number of regions through a clustering technique;
        setting an area of the regions as a background region;
        identifying an outer peripheral pixel and an inner peripheral pixel of each region except for the background region of the divided regions;
        setting a region identified as having one of its outer peripheral pixels and its inner peripheral pixels corresponding to a pixel of the background region, as a boundary region;
        setting a region identified as having any of its outer peripheral pixels and its inner peripheral pixels not corresponding to a pixel of the background region, as a center text region; and
        excluding the boundary region from a binary-coding object of the text.

7. The text recognition apparatus of claim 6, wherein the background region is a region of the highest pixel frequency among the divided three regions.

8. The text recognition apparatus of claim 6, wherein the background region is a region of the most constant pixel pattern among the divided three regions.

9. The text recognition apparatus of claim 6, wherein the control unit
    recognizes a character by excluding pixels which correspond to the boundary region and performs binary-coding of the background region and the center text region.

10. The text recognition apparatus of claim 6, wherein the boundary region is divided into an outer peripheral region wrapping the center text region outside of the center text region and an inner peripheral region wrapping the center text region inside of the center text region.

* * * * *